United States Patent
Arimilli et al.

(10) Patent No.: US 6,434,669 B1
(45) Date of Patent: *Aug. 13, 2002

(54) METHOD OF CACHE MANAGEMENT TO DYNAMICALLY UPDATE INFORMATION-TYPE DEPENDENT CACHE POLICIES

(75) Inventors: Ravi Kumar Arimilli; Lakshminarayana Baba Arimilli; James Stephen Fields, Jr., all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/390,189

(22) Filed: Sep. 7, 1999

(51) Int. Cl.[7] ................................................ G06F 12/06
(52) U.S. Cl. ........................ 711/128; 711/129; 711/133; 711/145
(58) Field of Search ................................ 711/128, 129, 711/133, 134, 123, 145

(56) References Cited

U.S. PATENT DOCUMENTS

| | | | | | |
|---|---|---|---|---|---|
| 5,210,843 | A | * | 5/1993 | Ayers | 711/128 |
| 5,651,135 | A | * | 7/1997 | Hatakeyama | 711/120 |
| 5,717,893 | A | * | 2/1998 | Mattson | 711/129 |
| 5,751,990 | A | * | 5/1998 | Krolak et al. | 711/118 |
| 6,014,728 | A | * | 1/2000 | Baror | 711/133 |
| 6,032,227 | A | * | 2/2000 | Shaheen et al. | 711/129 |
| 6,044,478 | A | * | 3/2000 | Green | 714/42 |
| 6,047,358 | A | * | 4/2000 | Jacobs | 711/133 |
| 6,058,456 | A | * | 5/2000 | Armilli et al. | 711/118 |
| 6,148,368 | A | * | 11/2000 | DeKoning | 711/129 |
| 6,260,114 | B1 | * | 7/2001 | Schug | 711/129 |
| 6,272,598 | B1 | * | 8/2001 | Arlittet | 711/133 |

* cited by examiner

*Primary Examiner*—Matthew Kim
*Assistant Examiner*—Pierre-Michel Bataille
(74) *Attorney, Agent, or Firm*—Casimer K. Salys; Bracewell & Patterson, L.L.P.

(57) ABSTRACT

A set associative cache includes a cache controller, a directory, and an array including at least one congruence class containing a plurality of sets. The plurality of sets are partitioned into multiple groups according to which of a plurality of information types each set can store. The sets are partitioned so that at least two of the groups include the same set and at least one of the sets can store fewer than all of the information types. To optimize cache operation, the cache controller dynamically modifies a cache policy of a first group while retaining a cache policy of a second group, thus permitting the operation of the cache to be individually optimized for different information types. The dynamic modification of cache policy can be performed in response to either a hardware-generated or software-generated input.

23 Claims, 5 Drawing Sheets

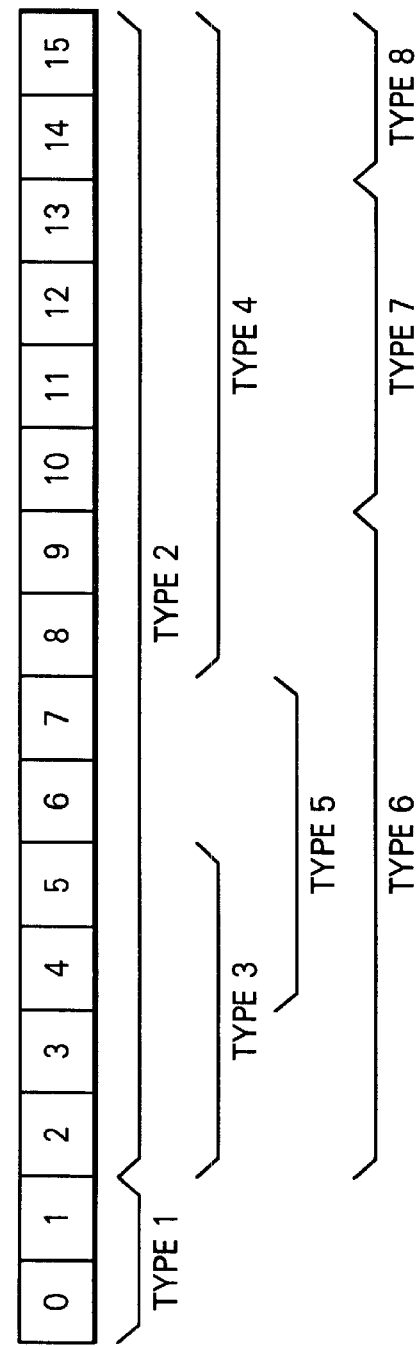

METHOD OF CACHE MANAGEMENT TO DYNAMICALLY UPDATE INFORMATION-TYPE DEPENDENT CACHE POLICIES

CROSS-REFERENCE TO RELATED APPLICATIONS

The present application is related to the following co-pending patent application, which are filed on even date herewith and incorporated by reference:

(1) U.S. application Ser. No. 09/390,187; and
(2) U.S. application Ser. No. 09/390,186.

BACKGROUND OF THE INVENTION

1. Technical Field

The present invention relates in general to data processing and, in particular, to cache memory in a data processing system. Still more particularly, the present invention relates to a set associative cache in a data processing system that stores information in particular sets according to information type.

2. Description of the Related Art

A cache is a small amount of expensive high-speed memory, which is commonly utilized within a data processing system to improve a processor's access time to data stored within an associated memory, thereby decreasing access latency. A cache typically comprises a number of cache lines, which each include several bytes of data. Data stored within memory is mapped into a cache utilizing an index portion of the memory addresses associated with the data, such that multiple memory addresses having the same index portion map to the same cache line. Cached data associated with a particular memory address are distinguished from data associated with other addresses having the same index portion by an address tag, typically the high order address bits, which is stored in association with the cached data. In order to minimize the conflict between data associated with addresses having identical index portions, many data processing system caches are implemented as set associative caches, which include a number of congruence classes that each contain multiple sets (storage locations) for storing cache lines.

When data requested by the processor does not reside within a set associative cache, a cache miss occurs, and the requested data are fetched from a lower level cache or memory. In order to accommodate the requested data within the cache, data resident within one of the sets of the congruence class to which the requested data maps often must be replaced or "cast out." The replaced set is typically selected utilizing a single predetermined victim selection algorithm, such as a least recently used (LRU) or most recently used (MRU) algorithm, that is believed, on average, to retain in the cache data having the highest probability of being requested by the processor.

The present invention recognizes that a significant drawback of conventional cache architectures is that they apply uniform allocation and victim selection policies (and other cache policies) to all types of data regardless of the persistence (or other characteristics) of the data. For example, while an LRU victim selection algorithm may be optimal for application data, other types of data stored within the same congruence class, for example, program instructions or address translation table entries, may have differing persistence and may therefore be more efficiently managed utilizing a different victim selection policy.

SUMMARY OF THE INVENTION

The present invention addresses the above-noted shortcomings of prior art cache architectures by introducing a set associative cache that implements information type-dependent policies, and in particular, information type-dependent allocation and victim selection policies.

A set associative cache in accordance with the present invention includes a cache controller, a directory, and an array including at least one congruence class containing a plurality of sets. The plurality of sets are partitioned into multiple groups according to which of a plurality of information types each set can store. The sets are partitioned so that at least two of the groups include the same set and at least one of the sets can store fewer than all of the information types. To optimize cache operation, the cache controller dynamically modifies a cache policy of a first group while retaining a cache policy of a second group, thus permitting the operation of the cache to be individually optimized for different information types. The dynamic modification of cache policy can be performed in response to either a hardware-generated or software-generated input.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a more detailed depiction of an exemplary information type field within the cache directory shown in FIG. 3;

FIG. 5 illustrates an exemplary partitioning of the sets of a set-associative cache by information type into overlapping and non-overlapping "virtual caches" in accordance with the present invention;

DETAILED DESCRIPTION OF ILLUSTRATIVE EMBODIMENT

System Overview

Figure 1:
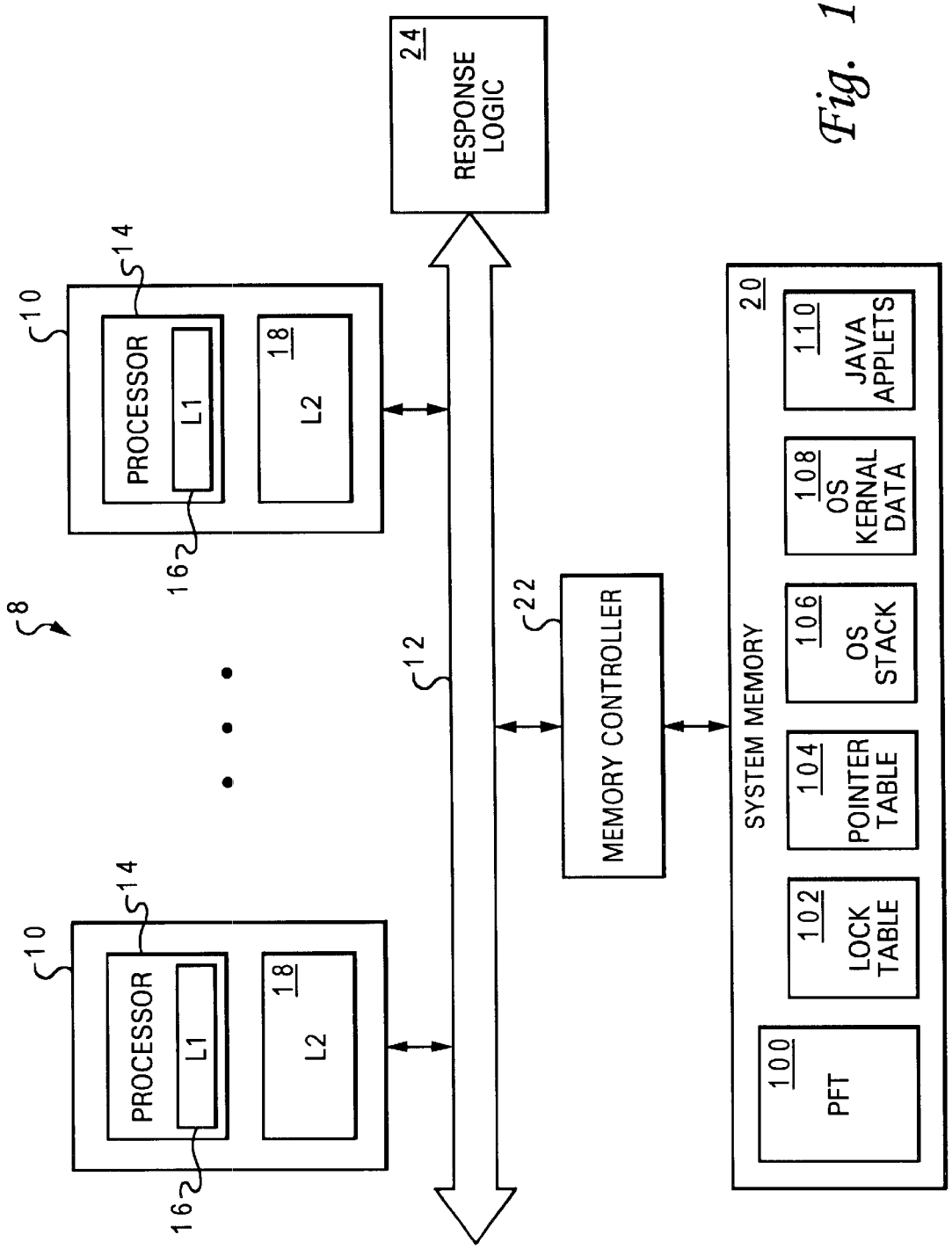
FIG. 1 depicts an illustrative embodiment of a data processing system with which the method and system of the present invention may advantageously be utilized.

With reference now to the figures and in particular with reference to FIG. 1, there is illustrated a high level block diagram of a multiprocessor data processing system including a cache in accordance with the present invention. As depicted, data processing system 8 includes a number of processing units 10 coupled to a system interconnect 12. Each processing unit 10 is an integrated circuit including one or more processors 14. In addition to the registers, instruction flow logic and execution units utilized to execute program instructions, each of processors 14 also includes an associated level one (L1) cache 16, which temporarily stores instructions and data that are likely to be accessed by the associated processor 14. Although L1 caches 16 are illustrated in FIG. 1 as unified caches that store both instruction and data (collectively referred to hereinafter as information), those skilled in the art will appreciate that each of L1 caches 16 could alternatively be implemented as bifurcated instruction and data caches.

As further illustrated in FIG. 1, in addition to L1 caches 16, the memory hierarchy of data processing system 8 also includes system memory 20, which forms the lowest level of volatile storage in the memory hierarchy, and one or more lower levels of cache memory, such as on-chip level two (L2) caches 18, which are utilized to stage information from system memory 20 to processors 14. Of course, in other embodiments of data processing system 8, the memory hierarchy could be expanded to include additional lower levels of on-chip or off-chip cache (L3, L4, etc.), and system memory 20 could be distributed.

As understood by those skilled in the art, each succeeding lower level of the memory hierarchy is typically capable of storing a larger amount of information than higher levels, but at a higher access latency. For example, in an exemplary embodiment, L1 caches 16 may each have 2048 64-byte cache lines for a total storage capacity of 128 kilobytes (kB), all at 1–3 cycle latency, and L2 caches 18 may each have 8192 128-byte cache lines for a total storage capacity of 1 MB at approximately 10–20 cycle latency. System memory 20 can store tens or hundreds of megabytes of information at an even longer latency, for example, 300–400 cycles. Given the large disparity in access latencies between the various levels of the memory hierarchy, it is advantageous to reduce accesses to lower levels of the memory hierarchy and, in particular, to system memory 20 through optimized caching policies.

System interconnect 12, which can comprise one or more buses or a cross-point switch, serves as a conduit for communication transactions between processing units 10 and other snoopers (e.g., memory controller 22) coupled to system interconnect 12. A typical transaction on system interconnect 12 begins with a request, which may include a transaction field indicating the type of transaction, source and destination tags indicating the source and intended recipient(s) of the transaction, respectively, and an address and/or data. Each device connected to system interconnect 12 preferably snoops all transactions on system interconnect 12 and, if appropriate, responds to the request with a snoop response. Such snoop responses are received and compiled by response logic 24, which provides a combined response indicating what action, if any, each snooper is to take in response to the request. These actions may include sourcing data on system interconnect 12, storing data provided by the requesting snooper, etc.

Those skilled in the art will appreciate that data processing system 8 can include many additional components, such as bridges to additional interconnects, I/O devices, non-volatile storage, ports for connection to networks or attached devices, etc. Because such additional components are not necessary for an understanding of the present invention, they are not illustrated in FIG. 1 or discussed further herein. It should also be understood that the cache enhancements provided by the present invention are applicable to data processing systems of any architecture and are in no way limited to the particular system architecture illustrated in FIG. 1.

Processor Architecture

Figure 2:
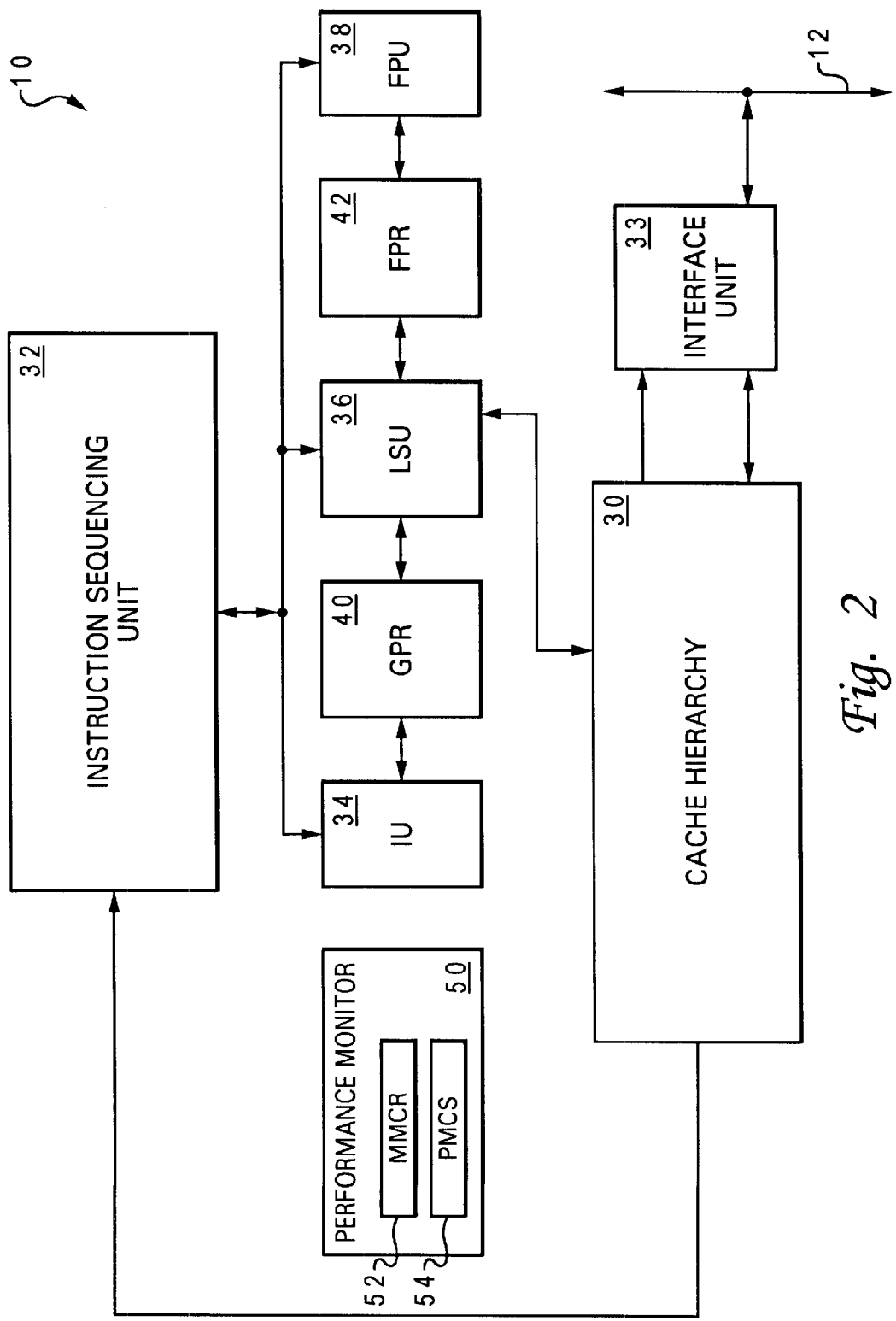
FIG. 2 is a more detailed block diagram of a processing unit within the data processing system shown in FIG. 1.

Referring now to FIG. 2, there is depicted a high level block diagram of an illustrative embodiment of a processing unit 10 within data processing system 8 of FIG. 1. As illustrated, processing unit 10 includes a cache hierarchy 30, comprising an L1 cache 16 and an L2 cache 18, which is coupled to system interconnect 12 by an interface unit 32. Cache hierarchy 30 is further connected to instruction sequencing unit 32, which fetches instructions from cache hierarchy 30 during each cycle.

Branch instructions fetched from cache hierarchy 30 are processed internally by instruction sequencing unit 32; sequential instructions, on the other hand, are dispatched for execution by integer unit (IU) 34, load-store unit (LSU) 36, and floating-point unit (FPU) 38, which can each execute one or more classes of instructions. Instructions can be executed concurrently and opportunistically by IU 34, LSU 36, and FPU 38 in any order as long as data dependencies and antidependencies are observed. As shown, IU 34 and FPU 38 each have a respective register file, namely, General-Purpose Register (GPR) file 40 and Floating-Point Register (FPR) file 42, from which operands are obtained and into which result data are stored. Data are transferred between register files 40 and 42 and cache hierarchy 30 by LSU 36 in response to execution of load and store instructions. After one of execution units 34, 36 and 38 has finished executing an instruction, the execution unit typically stores data results, if any, in a rename buffer associated with its respective register file and notifies a completion buffer within instruction sequencing unit 32. Thereafter, the data results of the instruction are transferred from the rename buffer into one or more architected registers within the appropriate one of register files 40 and 42.

Still referring to FIG. 2, the hereinbefore described operation of processing unit 10, including the behavior of cache hierarchy 30, can be monitored utilizing performance monitor 50, which in the illustrative embodiment is a software-accessible mechanism capable of providing detailed information descriptive of the utilization of instruction execution resources and storage control.

Although not illustrated in FIG. 2, performance monitor 50 is coupled to each functional unit of processing unit 10 in order to permit the monitoring of all aspects of the operation of processing unit 10 including reconstructing the relationship between events, identifying false triggering, identifying performance bottlenecks, monitoring pipeline stalls, monitoring idle cycles, determining dispatch efficiency, determining branch efficiency, determining the performance penalty of misaligned data accesses, identifying the frequency of execution of serialization instructions, identifying inhibited interrupts, monitoring hit ratios and other performance characteristics of cache hierarchy 30, and determining CPI (cycles per instruction) performance efficiency. Performance monitor 50 includes an implementation-dependent number (e.g., 2–8) of performance monitor counters (PMCs) 54, which are utilized to count occurrences of selected events. Performance monitor 50 further includes at least one monitor mode control register (MMCR) 52 that specifies the function of each of PMCs 54. PMCs 54 and MMCR 52 can be implemented as special purpose registers (SPRs) that are software accessible by special read and write instructions executable by one or more of execution units 34, 36 or 38; alternatively, PMCs 54 and MMCR 52 may be implemented simply as addresses in I/O space accessible via conventional load and store instructions.

Cache Architecture

Figure 3:
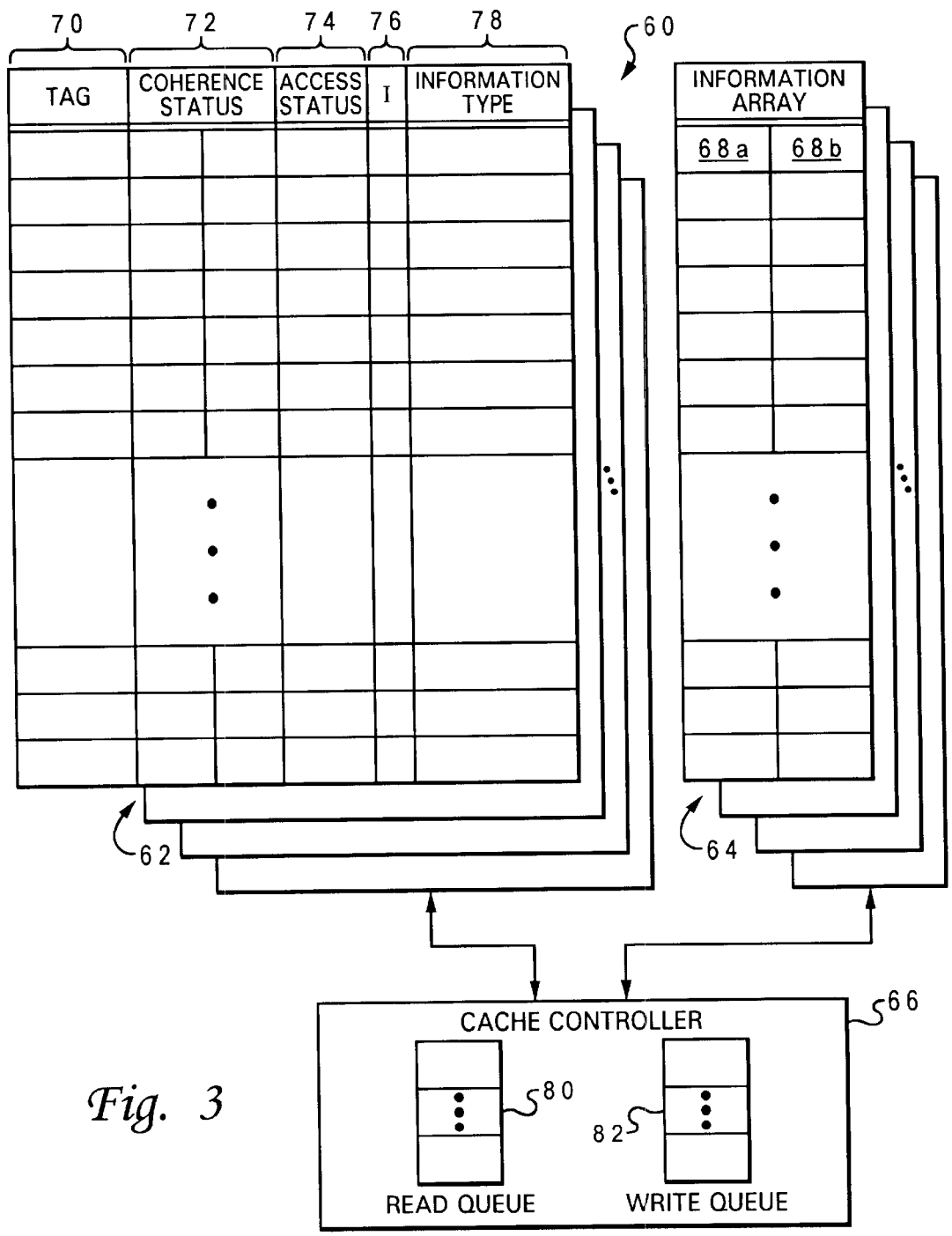
FIG. 3 is a more detailed block diagram of a cache memory in accordance with the present invention.

With reference now to FIG. 3, there is depicted a more detailed block diagram of an illustrative embodiment of a cache 60 that may be utilized to implement any of L1 caches 16 and L2 caches 18 of data processing system 8 in accordance with the present invention. In the illustrative embodiment, cache 60 is a sixteen-way set associative cache including a directory 62, an information array 64, and a cache controller 66.

Information array 64 of cache 60 comprises a number of congruence classes that each contain sixteen ways (or sets) for storing cache lines. As in conventional set associative caches, memory locations in system memory 20 are mapped to particular congruence classes within information array 64 utilizing predetermined index bits within the system memory address. As further shown in FIG. 3, each cache line within information array 64 may be sectored into two sectors 68a, 68b that can be individually accessed and modified. Although support for sectoring is not required by the present invention, it is convenient if the sector size utilized by each cache is the same as the cache line size of the associated higher level cache, if any. For example, if L1 caches 16 have 64-byte cache lines (two 32-byte sectors), L2 caches 18 may implement 128-byte (two 64-byte sectors) cache lines.

The cache lines stored within information array 64 are recorded in cache directory 62, which contains one directory entry for each set in information array 64. The directory entry informs cache controller 66 how to handle the cache line contained in the associated set. In the illustrated embodiment, each directory entry comprises a tag field 70, a coherence status field 72, an access status field 74, an inclusion field 76, and an information type field 78. Tag field 70 specifies which of the multiple cache lines mapping to the congruence class is stored in the corresponding set of information array 64 by storing the tag bits of the system memory address of the cache line. Coherence status field 72 separately indicates the coherence status (e.g., MESI state) of each sector of the cache line stored in the corresponding set of information array 64 utilizing predefined bit combinations. Access status field 74 indicates how recently the corresponding set of information array 64 has been accessed relative to the other sets of its congruence class, thus providing information cache controller 66 can utilize in the victim selection process following a cache miss, as discussed below. Inclusion field 76 indicates whether or not each sector of the cache line stored in the corresponding set of information array 64 is also stored in the local memory unit (i.e., cache or system memory) at the next lowest level of the memory hierarchy. Finally, information type field 78 specifies which type(s) of information the associated set can store. As shown in FIG. 4, in one embodiment, information type field 78 can be utilized to indicate (e.g., by a set or reset bit corresponding to each information type) which one(s) of eight information types each set is permitted to store.

Referring again to FIG. 3, cache controller 66 manages storage and retrieval of information within information array 64 and updates to cache directory 62 in response to signals received from an associated processor or cache, and, if an L2 cache 18, address and data transactions snooped on system interconnect 12. As illustrated, cache controller 66 maintains a read queue 80 and a write queue 82 from which cache controller 66 performs accesses and updates to cache directory 62 and information array 64.

Cache Partitioning by Information Type

In accordance with the present invention, the information array 64 of a single cache 60 can be partitioned, by information type, into multiple "virtual caches" having associativities ranging from one (i.e., a direct mapped cache) to sixteen by appropriate settings of information type fields 78. The sets belonging to each "virtual cache" can either be disjoint (e.g., eight two-way set associative "virtual caches") or overlapping. For example, FIG. 5 illustrates the sets of a sixteen-way set associative cache being partitioned into two two-way set associative "virtual caches" for information types 1 and 8, a fourteen-way set associative "virtual cache" for information type 2, three four-way set associative "virtual caches" for information types 3, 5 and 7, and two eight-way set associative "virtual caches" for information types 4 and 6. Of these "virtual caches," all overlap at least one other "virtual cache," except that allocated to information type 1. Of course, information type fields 78 can be set differently between congruence classes; however, for simplicity it is advantageous in most cases to maintain consistent settings for information type fields 78 between corresponding sets of all congruence classes (but not across sets within a congruence class) in a cache. If the flexibility of setting the information type fields 78 of corresponding sets in different congruence classes differently is not desired or required, a single 16-byte information type field (one bit for each information type and one byte for each set) could be implemented. Moreover, although a cache can be partitioned otherwise, in a preferred embodiment the number of sets within each partition is constrained to be a power of two (e.g., 1, 2, 4, 8 or 16).

Figure 6:
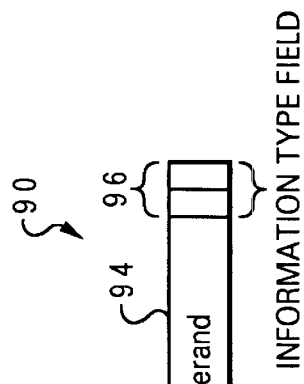
FIG. 6 depicts an exemplary embodiment of an instruction containing an information type field that specifies the information type of the information accessed by that instruction.

According to the present invention, the manner in which information in the memory hierarchy is assigned an information type can be either predetermined (i.e., determined by hardware), programmable by software, or, as a preferred embodiment, can be partially predetermined and partially software-programmable. In this preferred embodiment of the present invention, the programmable information types can be applied to information through information type field extensions to load and store instructions that, when executed, cause processors 14 to access caches 16 and 18. For example, FIG. 6 illustrates a load or store instruction 90 that, in addition to an opcode field 92, and an operand field 94, includes a two-bit information type field 96 that can specify one of four programmable information types. As will be appreciated by those skilled in the art, the bits within information type field 96 can be set by a compiler programmed to take advantage of the information typing supported by the present invention or can be supplied together with the instruction by the programmer. If no bits are set, the information accessed by instruction 90 will be handled according to the underlying hardware-defined default information types.

For both software programmable information types and hardware-predetermined information types, the present invention contemplates that information can be assigned to an information type according to any metric believed to be useful or shown by performance data to contribute to improved performance. In one embodiment, information can be assigned to various information types according to the hardware requestor that requests the information from the cache. For example, instructions requested by ISU 32 can form a first information type, data requested by LSU 36 can form second information type, and instruction translation lookaside buffer (ITLB) entries and data TLB (DTLB) entries requested by the address translation unit of cache hierarchy 30 can form third and fourth information types, etc. This scheme for assigning information types to information is particularly suitable for hardware implementation (i.e., predetermined groups) since the identity of the processor hardware requesting the information can easily be provided to cache controller 66 with the information request, and cache controller 66 can utilize the requester identity as an indicator of information type (and therefore how to handle the information) as the information is loaded into cache 60 from lower level cache, system memory 20 or another processing unit 10.

The broad categories of information discussed above can be further subdivided into additional information types. For example, rather than utilizing the broad category of "data" as an information type, separate information types can be implemented for floating-point data, integer data, and data that are the target of load-reserve instructions. Similarly, multiple classes of instructions can be employed as information types in lieu of the larger information type "instructions." In addition, greater granularity can be implemented for the DTLB and ITLB entry information types according to the Page Table Entry Group (PTEG) (i.e., P0 or P1) in the Page Frame Table (PFT) 100 of system memory 20 in which they reside. (Additional information regarding PTEGs may be found, for example, in *PowerPC™ 603 RISC Microprocessor User's Manual*, published by IBM Microelectronics as Order No. MPR603UMU-01 and incorporated herein by reference.) The greater granularity afforded by these information types entails the provision of additional information to the cache controller 66 from either the hardware requester (e.g., LSU 36 can provide an indication of the type of load or store instruction) or from the information source (e.g., memory controller 22 can provide an indication of the PTEG group in which a TLB entry resides).

Although the information typing described above can advantageously be employed to enhance cache performance, the present invention recognizes that further improvements in cache performance (e.g., hit ratios) can be achieved if knowledge of the characteristics of the application and operating system (OS) software generating the memory accesses is somehow communicated to the cache hierarchy. This can be accomplished by employing operating system-defined memory areas as indicators of information types. As an example, FIG. 1 illustrates that system memory 20 of data processing system 8 contains not only an operating system-defined PFT 100 as noted above, but also a number of other operating system-allocated memory areas—lock table 102, pointer table 104, OS stack 106, OS kernel data 108, and Java applets 110. Information within these different memory areas, which have different properties, functions, and characteristic reference patterns, are preferably each considered as a separate information type. Of course, system memory 20 can include other operating-system allocated memory areas for both operating system and application information. And because memory controller 22 records the location of operating-system allocated memory areas within system memory 20, memory controller 22 can supply an indication of information type to a requesting cache hierarchy 30 together with the requested information.

Regardless of the information types that are established, it is preferable, but not necessary, for vertical caches (e.g., L3, L2, and L1 caches for one processing unit) within the memory hierarchy to support the same information types. Supporting the same information types in vertical caches simplifies the communication of information type indications between vertical caches as information is transferred between vertical caches. It should also be noted that if the sets allocated to various information types are permitted to overlap and the allocation of sets to the various information types is permitted to differ between vertical caches, cache directories 62 are preferably augmented to include a second information type field that indicates the actual information type of the associated cache line so that the information type is not lost as the cache line is transferred between the vertical caches.

Setting Information Type Fields of a Cache

Information type fields 78 within a cache 60 are initialized at power-on to programmable or predetermined default states, for example, all 1's to indicate that each set can store any information type. Following initialization, the states of information type fields 78 can be dynamically updated during operation of data processing system 8 by either or both hardware and software.

Support for software updates to information type fields 78 can be provided in a variety of ways. For example, instruction type fields 78 can be implemented as software-writable registers that can be updated directly through the execution of instructions having one, multiple, or all of the instruction type fields 78 within a cache 60 as target registers. Instruction type fields 78 can alternatively or additionally be updated through the execution of cache management instructions targeting cache controllers 66. Such cache management instructions would be akin to conventional cache management instructions that cause a cache controller 66 to invalidate a specified cache block, flush the entire information array 64, etc. Instructions either targeting data type fields 78 directly or cache management instructions can be inserted by an instruction-type-aware compiler or programmer into software in order to set information type fields 78. The instruction type field settings applied by such instructions can be provided in a 16-byte mask that is loaded into a cache 60 or in one of a number of hardwired or programmable possible instruction type field settings within each cache 60, as discussed below.

Figure 7:
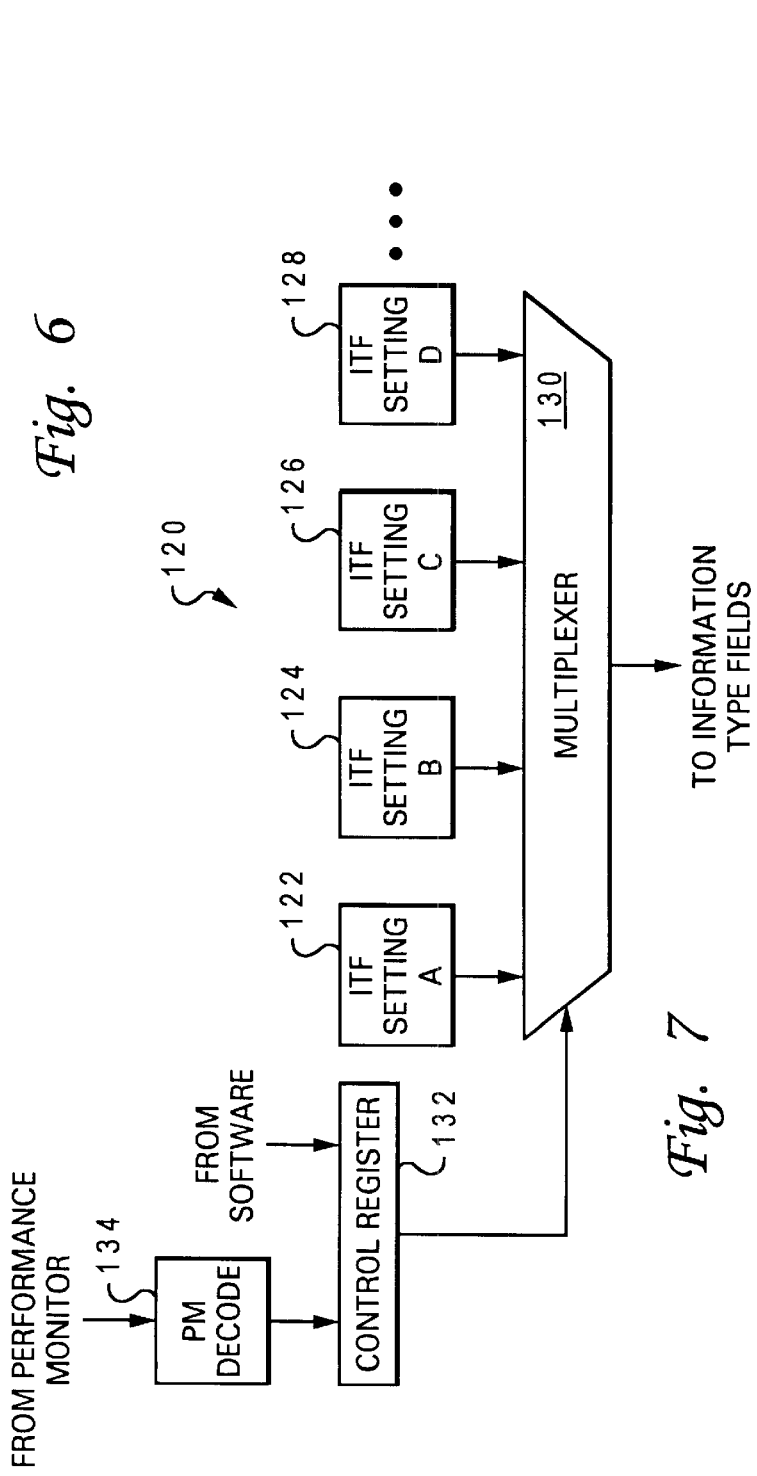
FIG. 7 illustrates an exemplary embodiment of an information type field (ITF) setting selection circuit that may be implemented within the cache controller of FIG. 3 in accordance with the present invention.

Alternatively or in addition to such software support for setting instruction type fields 78, hardware support is also possible. For example, with reference now to FIG. 7, there is illustrated an exemplary embodiment of an information type field (ITF) setting selection circuit 120 that may be implemented within each cache controller 66 in accordance with the present invention. As depicted, ITF setting selection circuit 120 includes a number of different possible ITF settings 122–128, which can each comprise either hardwired ITF settings or software-programmable ITF settings. One of possible ITF settings 122–128 is selected by multiplexer 130 as the currently implemented ITF setting in response to the contents of control register 132, which provides a selection input for multiplexer 130. As shown, control register 132 is software-accessible and, as discussed above, may be written by either a conventional load or store instruction targeting control register 132 or a special cache management instruction.

Alternatively or in addition, the contents of control register 132 may be determined by hardware. For example, performance monitor 50 may be programmed, through appropriate settings of PMCs 54, to separately monitor cache hit ratios for each "virtual cache" within a cache 60. If the number of cache misses for a particular "virtual cache" is disproportionately large, then performance monitor 50 will output an indication of the poorly performing "virtual cache." This indication can be decoded by PM decode logic 134 and utilized to write a value into control register 132 corresponding to a different one of ITF settings 122–138. Depending upon implementation, the newly selected ITF setting may have less overlap between the under-performing "virtual cache" and other "virtual caches" and/or may assign additional sets to the under-performing "virtual cache."

Information-Type-Dependent Cache Policies

As should be apparent from the foregoing, the broad concept of partitioning a unified cache into information-type-dependent "virtual caches" enables the operation of each "virtual cache" thus created to be optimized for the particular information type stored by that "virtual cache." Accordingly, any cache policy, characteristic, or behavior that is subject to programming or dynamic hardware management can be independently tuned for a particular information type (rather than all information types) in order to extract maximum performance from a cache architecture.

For example, as noted above, the contents of information type fields 78 within cache directory 62 determine the allocation policy implemented by a cache controller 66. When cache 60 receives information to be stored within information array 64, for example, from the associated processor 14, from an upper level cache, or from a lower level cache or system memory 22, cache controller 66 utilizes index bits within the associated memory address to select a particular congruence class. Cache controller 66 then examines the information type fields 78 associated with the sets within the selected congruence class to determine which of the sets is permitted to store the information type of the received information.

As is well-known to those skilled in the art, the allocation of a set within a cache to store an incoming cache line requires cache controller 66 to evict or replace a cache line if all sets capable of storing the incoming cache line contain valid information. According to the present invention, cache controller 66 can independently implement possibly diverse replacement policies for each "virtual cache" rather than implementing a single victim selection algorithm, such as the conventional Least Recently Used (LRU) algorithm, for all sets. Thus, through appropriate implementation of information types as discussed above, a cache controller 66 can apply one victim selection algorithm to floating-point data, which is typically referenced only once, and a different victim selection algorithm to OS kernel data, which is likely to be accessed many times.

The implementation of allocation and deallocation policies and associativities tuned for particular information types as discussed above should be understood as being merely exemplary of applications of the present invention. Thus, while the invention has been particularly shown and described with reference to a preferred embodiment, it will be understood by those skilled in the art that various changes in form and detail may be made therein without departing from the spirit and scope of the invention.

What is claimed is:

1. A cache comprising:
  at least one congruence class that contains a plurality of sets;
  a directory that specifies a partitioning of said plurality of sets into a plurality of groups according to which of a plurality of information types each set can store, wherein at least two of said groups include a same set among said plurality of sets and at least one set among said plurality of sets can store fewer than all of said plurality of information types; and
  a cache controller that concurrently implements different cache policies for at least two of said plurality of groups, wherein said cache includes a plurality of predetermined possible settings for said particular cache policy, and said cache controller modifies said particular cache policy by selecting a different one of said plurality of predetermined possible settings.

2. The cache of claim 1, wherein said different cache policies comprise different allocation policies.

3. The cache of claim 1, wherein said different cache policies comprise different cache line replacement policies.

4. The cache of claim 1, wherein said cache is associated with a processor, and wherein said cache controller modifies a particular cache policy for fewer than all of said plurality of groups in response to receipt of a hardware-generated signal from the processor.

5. The cache of claim 4, wherein said cache includes a plurality of predetermined possible settings for said particular cache policy, and said cache controller modifies said particular cache policy by selecting a different one of said plurality of predetermined possible settings.

6. The cache of claim 1, wherein said cache is associated with a processor, and wherein said cache controller modifies a particular cache policy for fewer than all of said plurality of groups in response to receipt of an indication that a particular instruction has been executed by the processor.

7. The cache of claim 1, wherein said plurality of predetermined possible settings comprise associativities of said plurality of groups.

8. A data processing system, comprising:
  a processor; and
  a cache, coupled to said processor, that includes:
    at least one congruence class that contains a plurality of sets;
    a directory that specifies a partitioning of said plurality of sets into a plurality of groups according to which of a plurality of information types each set can store, wherein at least two of said groups include a same set among said plurality of sets and at least one set among said plurality of sets can store fewer than all of said plurality of information types; and
    a cache controller that concurrently implementing different cache policies for at least two of said plurality of groups, wherein said cache includes a plurality of predetermined possible settings for said particular cache policy, and said cache controller modifies said particular cache policy by selecting a different one of said plurality of predetermined possible settings.

9. The data processing system of claim 8, wherein said different cache policies comprise different allocation policies.

10. The data processing system of claim 8, wherein said different cache policies comprise implementing different cache line replacement policies.

11. The data processing system of claim 8, wherein said cache controller modifies a particular cache policy for fewer than all of said plurality of groups in response to receipt of a hardware-generated signal from the processor.

12. The data processing system of claim 11, wherein said processor includes a hardware performance monitor that transmits said hardware-generated signal to said cache in response to counting a threshold number of occurrences of a particular event.

13. The data processing system of claim 11, wherein said cache includes a plurality of predetermined possible settings for said particular cache policy, and said cache controller modifies said particular cache policy by selecting a different one of said plurality of predetermined possible settings.

14. The data processing system of claim 8, wherein said cache controller modifies a particular cache policy for fewer than all of said plurality of groups in response to receipt of an indication that a particular instruction has been executed by the processor.

15. The data processing system of claim 8, wherein said plurality of predetermined possible settings comprise associativities of said plurality of groups.

16. The data processing system of claim 8, and further comprising a memory coupled to said cache, wherein said cache can concurrently store only a subset of information contained within said memory.

17. A method of managing the storage of information in a single set associative cache having a cache controller, a directory, and an array including at least one congruence class containing a plurality of sets, said method comprising:

partitioning said plurality of sets into a plurality of groups according to which of a plurality of information types each set can store, said plurality of groups including a first group and a second group, wherein at least two of said groups include a same set among said plurality of sets and at least one set among said plurality of sets can store fewer than all of said plurality of information types; and utilizing a cache controller of said single set associative cache, dynamically modifying a cache policy for said first group and retaining a cache policy of said second group by selecting a different one of a plurality of predetermined possible sets for said particular cache policy.

18. The method of claim 17, wherein dynamically modifying a cache policy for said first group and retaining a cache policy of said second group comprises dynamically modifying an allocation policy for said first group while retaining an allocation policy for said second group.

19. The method of claim 17, wherein dynamically modifying a cache policy for said first group and retaining a cache policy of said second group comprises dynamically modifying a cache line replacement policy for said first group while retaining a cache line replacement policy for said second group.

20. The method of claim 17, wherein said cache is associated with a processor, and said method further comprises modifying said cache policy of said first group in response to receipt of a hardware-generated signal from the processor.

21. The method of claim 20, and further comprising:

counting a number of occurrences of a particular event utilizing a hardware performance monitor; and in response to counting a threshold number of occurrences, transmitting said hardware-generated signal to said cache.

22. The method of claim 20, wherein modifying a particular cache policy comprises selecting a different one of a plurality of predetermined possible settings for said particular cache policy.

23. The method of claim 17, wherein said cache is associated with a processor, and said method farther comprises modifying said cache policy of said first group in response to execution of an instruction by the processor.

* * * * *

UNITED STATES PATENT AND TRADEMARK OFFICE
CERTIFICATE OF CORRECTION

PATENT NO.   : 6,434,669 B1
DATED        : August 13, 2002
INVENTOR(S)  : Ravi Kumar Arimilli et al.

It is certified that error appears in the above-identified patent and that said Letters Patent is hereby corrected as shown below:

<u>Column 11,</u>
Line 17, after the word "possible" please change "sets" to -- settings --.

<u>Column 12,</u>
Line 21, after the word "method" please change "farther" to -- further --.

Signed and Sealed this

Fourth Day of March, 2003

JAMES E. ROGAN
*Director of the United States Patent and Trademark Office*